United States Patent
Aron et al.

(10) Patent No.: US 10,089,030 B2
(45) Date of Patent: *Oct. 2, 2018

(54) MAKING MORE ACTIVE USE OF A SECONDARY STORAGE SYSTEM

(71) Applicant: Cohesity, Inc., Santa Clara, CA (US)

(72) Inventors: Mohit Aron, Los Altos, CA (US); Vinay Reddy, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,053

(22) Filed: Feb. 6, 2018

(65) Prior Publication Data

US 2018/0157434 A1 Jun. 7, 2018

Related U.S. Application Data

(63) Continuation of application No. 14/309,869, filed on Jun. 19, 2014, now Pat. No. 9,921,769.

(51) Int. Cl.
*G06F 12/00* (2006.01)
*G06F 3/06* (2006.01)
*G06F 11/14* (2006.01)
*G06F 11/20* (2006.01)

(52) U.S. Cl.
CPC ............ *G06F 3/0626* (2013.01); *G06F 3/065* (2013.01); *G06F 3/067* (2013.01); *G06F 3/0617* (2013.01); *G06F 11/1446* (2013.01); *G06F 11/1448* (2013.01); *G06F 11/1451* (2013.01); *G06F 11/1456* (2013.01); *G06F 11/20* (2013.01); *H05K 999/99* (2013.01); *G06F 2201/84* (2013.01)

(58) Field of Classification Search
CPC ................... G06F 11/1446–11/1469
See application file for complete search history.

(56) References Cited

U.S. PATENT DOCUMENTS

| | | | |
|---|---|---|---|
| 6,708,227 B1 | 3/2004 | Cabrera | |
| 8,818,936 B1 | 8/2014 | Haase | |
| 9,720,926 B2* | 8/2017 | Aron | G06F 17/30309 |
| 9,720,947 B2* | 8/2017 | Aron | G06F 17/30327 |
| 9,792,309 B2* | 10/2017 | Aron | G06F 17/30327 |
| 9,952,783 B2* | 4/2018 | Lu | G06F 3/0619 |
| 2005/0010592 A1 | 1/2005 | Guthrie | |
| 2005/0114402 A1 | 5/2005 | Guthrie, II | |
| 2007/0288711 A1 | 12/2007 | Chen | |
| 2008/0104139 A1 | 5/2008 | Xu | |
| 2009/0265516 A1 | 10/2009 | Prabhu | |
| 2011/0167088 A1 | 7/2011 | Warren | |

(Continued)

*Primary Examiner* — Prasith Thammavong
(74) *Attorney, Agent, or Firm* — Van Pelt, Yi & James LLP

(57) ABSTRACT

Techniques are disclosed which allow a secondary storage system to provide data to non-production workloads in conjunction with performing data backup and protection tasks. As disclosed, a secondary storage system exposes backup data stored by the secondary storage system to other workloads, such as test and development applications, data analytics, etc. These non-production workloads can run at the same time the secondary storage system provides backup services to a primary storage system. This consolidation eliminates the need for an enterprise to deploy separate storage clusters for analytics, test and development applications, etc. and eliminates unnecessary copies of data.

20 Claims, 11 Drawing Sheets

(56) References Cited

U.S. PATENT DOCUMENTS

| | | |
|---|---|---|
| 2011/0320496 A1 | 12/2011 | Reid |
| 2014/0040199 A1 | 2/2014 | Golab |
| 2014/0149698 A1 | 5/2014 | Ezra |
| 2015/0143065 A1* | 5/2015 | Lu .......................... G06F 3/061 |
| | | 711/162 |
| 2017/0109243 A1* | 4/2017 | Kumar ................ G06F 11/1466 |
| 2017/0344590 A1* | 11/2017 | Aron ................. G06F 17/30327 |

* cited by examiner

MAKING MORE ACTIVE USE OF A SECONDARY STORAGE SYSTEM

CROSS REFERENCE TO OTHER APPLICATIONS

This application is a continuation of co-pending U.S. patent application Ser. No. 14/309,869 entitled MAKING MORE ACTIVE USE OF A SECONDARY STORAGE SYSTEM filed Jun. 19, 2014 which is incorporated herein by reference for all purposes.

BACKGROUND OF THE INVENTION

Field of the Invention

Embodiments described herein relate to a secondary storage system that supports multiple types of workloads. More specifically, embodiments described herein provide a secondary storage system that can run non-production workloads while also providing data backup or protection to a primary storage system.

Description of the Related Art

Workloads on a computer system are a way of characterizing the demand on the resources of a computer system due to a particular task running on the computer. For example, some types of workloads place extreme demands on the CPU while other types of workloads place extreme demands on the disk subsystem. Often, workloads that place extreme demands on the disk subsystem are those that require a high number of random I/O operations. These operations thus cause the throughput of the disk system to drop substantially, making the system almost unusable, especially in the midst of other workloads attempting to use the system.

A primary storage system usually stores data for enterprise applications. For example, a primary storage system may store data for a cluster of physical computing systems or virtual machine instances running on a physical server system. The primary storage system operates to provide fast, high-availability storage for the enterprise applications.

A secondary storage system is used to provide data backup and protection services for the primary storage systems supporting the enterprise. Secondary storage systems are often used only for data protection purposes, despite the fact that they may provide powerful computing power. This occurs, in part, because secondary storage systems are optimized for serial I/O operations used to capture data from the primary storage system. In addition to storage systems, an enterprise may deploy a variety of other systems or appliances to perform non-production tasks, such as business analytics or test and development clusters to develop, install, configure, and deploy enterprise software applications. A secondary storage system optimized for serial I/O operations is ill-suited to perform these tasks. As a result, an enterprise may deploy one system that provides the data backup and protection services for their primary storage systems and deploy other systems to run test and development applications, analytics, etc. However, dedicating numerous separate secondary systems to each individual workload becomes inefficient and wasteful. At a minimum, it leads to a need for more physical systems, as well as to duplicate data, creating a maintenance problem.

SUMMARY OF THE INVENTION

One embodiment of the invention includes a method for providing access to data stored in a secondary storage system. This method may generally include receiving data from a primary storage system to store in the secondary storage system. The received data provides a backup of data stored by the primary storage system. This method may generally include generating at least a first view of the received data and generating, from the first view, at least a second view. The second view exposes the received data to a client system according to a first protocol. In response to receiving a read request from the client system for data exposed by the second view, data from the second view is retrieved and returned to the requesting client system.

In a particular embodiment, in response to a request from the client system to perform a write operation to an element of the received data exposed by the second view, the method may further include performing the write operation to the requested element of data accessed via the second view without modifying a corresponding element of the received data accessed via the first view. Additionally, the second view may correspond to a state of data in the primary storage system at a given point in time, as captured by a backup stored by the secondary the secondary storage system. Further, the first view and the second view may each have an associated tree data structure having a plurality of nodes. Leaf nodes of the tree data structures store metadata indicating a location of data exposed by the views. Further still, the step of generating the second view may itself include copying a root node of the tree data structure associated with the first view.

Another embodiment includes a secondary storage system which includes one or more computing nodes, where each node has at least one computer processor, a memory, and one or more local storage devices and wherein each node hosts an instance of one or more applications which provide access to data stored in the storage devices by performing an operation. This operation itself may generally include receiving data from a primary storage system to store in the secondary storage system. The received data provides a backup of data stored by the primary storage system. This method may generally include generating at least a first view of the received data and generating, from the first view, at least a second view. The second view exposes the received data to a client system according to a first protocol. In response to receiving a read request from the client system for data exposed by the second view, data from the second view is retrieved and returned to the requesting client system.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Embodiments presented herein provide an architecture for a secondary storage system that can provide non-production workloads with access to data storage while also performing data protection tasks. For example, embodiments described below provide a secondary storage system that can expose backup data to test and development applications, data analytics, etc. These applications can run at the same time the secondary storage system takes backups of a production system. This consolidation eliminates the need for an enterprise to deploy separate storage clusters for analytics, test and development applications, etc., and eliminates unnecessary copies of data. Doing so can significantly reduce the costs and management overhead needed to run the non-production workloads within an enterprise.

Further, embodiments presented herein isolate data protection related tasks from other active workloads. For example, as described below, a snapshot of a primary system can be created and exposed to a non-production cluster (such as a test and development or analytics cluster). Doing so allows the non-production workload to operate on a local view of the data provided by the secondary storage system, without limiting or interfering with the ability of an enterprise to use the secondary storage system for the primary purpose—to capture data from a primary storage system and to restore data to a primary storage system if needed. Further, embodiments of a secondary storage system described herein have an architecture with I/O capabilities needed by the non-production workloads to operate efficiently and effectively.

In one embodiment, the secondary storage system is a set of nodes that captures views, which capture backup data from the primary storage system. A current view generally corresponds to a (near) real-time backup state of a primary system data store (e.g., a backup of the storage of a virtual machine cluster, a database, or just a bunch of disks providing storage to an enterprise application). A snapshot represents a backup state of a primary storage a particular point in time. That is, each snapshot provides a state of data used by a primary system, which can be restored to the primary storage system if needed. Similarly, a snapshot can be exposed to a non-production workload, or a clone of a snapshot can be created should a non-production workload need to write to the snapshot without interfering with the original snapshot.

In one embodiment, secondary storage system organizes backup data for a snapshot in a tree structure, referred to as a snaptree. Each leaf node of the snaptree includes a key-value pair describing file system metadata. As described below, a snapshot of a view can be created by cloning the root node of that view. The structure of a snaptree allows snapshots that can be created in (near) real-time and that can be quickly accessed and/or modified by a user of a development system user or business analytics user, etc.

Figure 1:
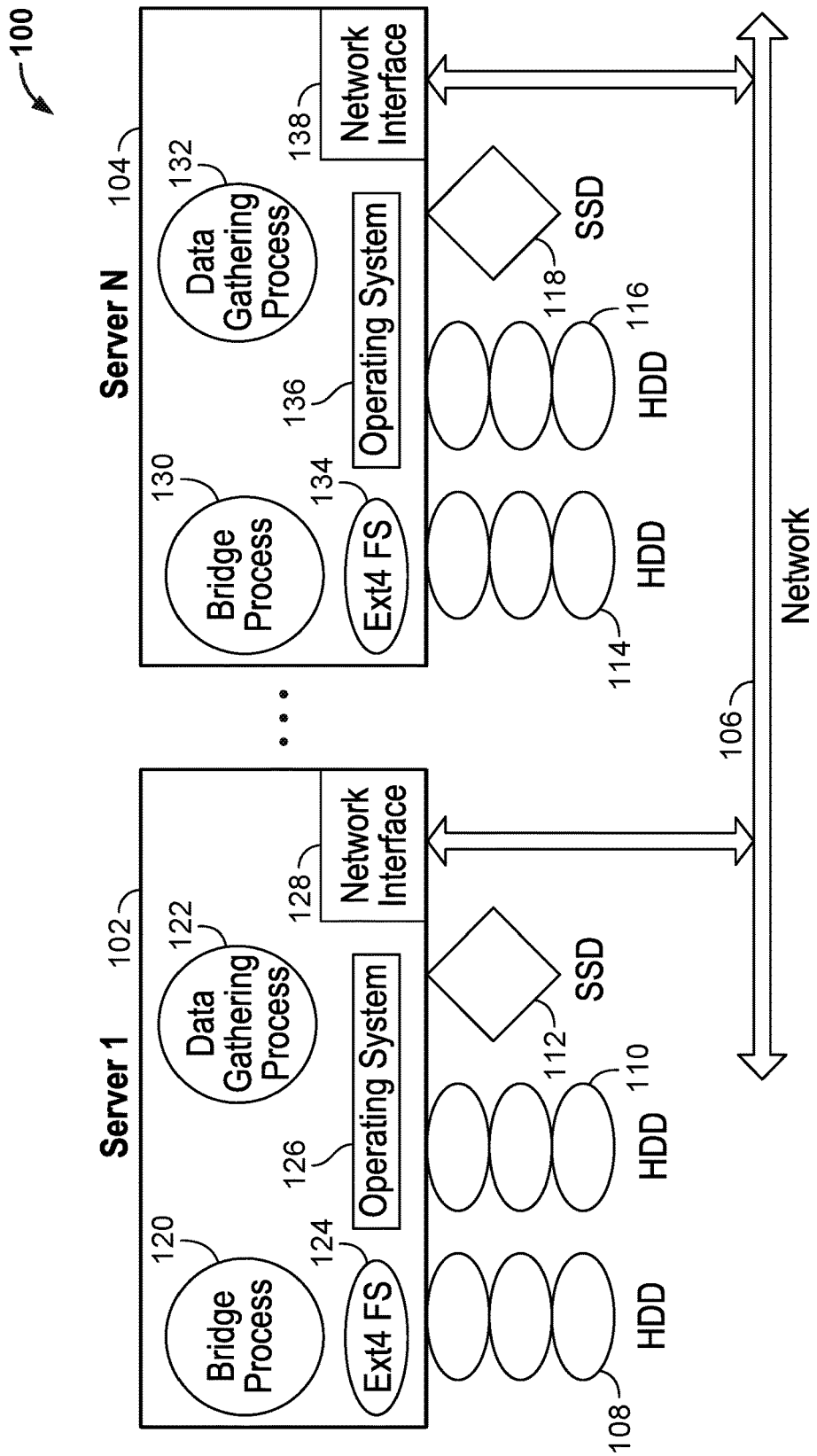
FIG. 1 depicts an example secondary storage system, according to one embodiment.

FIG. 1 illustrates an example of a secondary storage system 100, according to one embodiment. As shown, the secondary storage system 100 includes a plurality of servers 102,104 each connected to a network 106 by network interface 128, 138, respectively. Each server 102, 104 includes a plurality of storage units such as hard disk drives (HDDs) 108, 110, 114, 116 for large amounts of storage and solid state drives (SSDs) 112, 118 for persistent storage with fast access. In one embodiment, each server 102, 104, runs an operating system 126, 136 such as a distribution of the Linux® operation system and supports a file system 124, 134 such as Ext4FS. As shown, each server 102, 104 executes an instance of a bridge process 120, 130 and an instance of a data gathering process 122, 132. As described in greater detail below, these processes carry out the functions, including the backup functions, of the secondary storage system 100.

Figure 2:
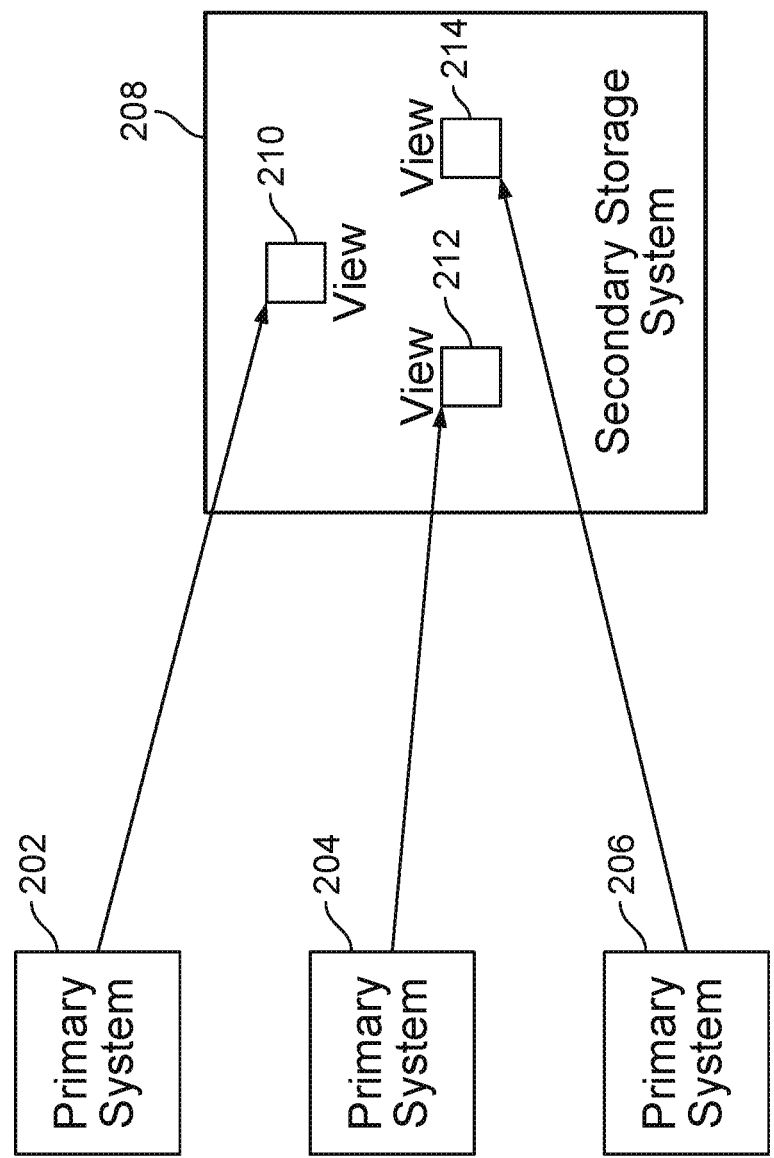
FIG. 2 depicts views of primary system on secondary storage system, according to one embodiment.

As noted, a view exposes a collection of data backed up from a primary system. For example, FIG. 2 depicts three primary systems, labeled P1 202, P2 204, and P3 206 and a secondary storage system S 208. Primary systems 202, 204, and 206 each provide a set of computing systems and applications with data backed-up by the secondary storage system 208. Examples of primary systems include, e.g., P1 202 running the a database application, primary system P2 204 running an OpenStack cluster and primary system P3 206 running a VMware cluster. As known, OpenStack provides a collection of open-source software projects used to provide a cloud-computing platform, including tools for managing processing, storage, and networking resources throughout a data center. And VMware provides commercial software products for managing a cluster of virtual machine instances running on physical system.

In one embodiment, the secondary storage system 208 creates a view 210, 212, 214 for each of primary system 202, 204, and 206. Each view exposes backup data captured by data gathering process 122, 132 from the relevant primary system. That is, data gathering process 122, 132 obtains data specified for backup from the primary systems 202, 204, and 206 and populates a corresponding view in the secondary storage system 208. In one embodiment, view 210, 212, and 214 generally corresponds to a backup state of one of the primary systems as data is retrieved from that primary system and written to the secondary storage system. Views provide backup data from a primary system "frozen" for a particular point in time, accordingly, a view may be referred to as a "snapshot." Thus, a snapshot refers to a consistent backup state for a primary system created at a specific point in time. For example, a snapshot of a current view of may be created of every five minutes. To do so, a new snaptree root node is created for each new snapshot every five minutes.

To create a new snapshot efficiently, the secondary storage system 300 may need only to create a copy of the root node of view from which the new snapshot is being created. Thus, when created, a new snapshot has its own snaptree root node, but this root node points back into the snaptree of the view from which the new snapshot is created. Thereafter, when a write is made to the new snapshot, new nodes in the new snaptree are created to store the modified data. Doing so allows the new snaptree to manage a current backup state (i.e., to provide the current view), while allowing prior backup states (accessed via the root node the snaptree being cloned) to point to prior versions of the same data. Accordingly, each view may have some nodes local that view but refer to nodes of other prior views where data has not changed. Similarly, a root node of a view for a newly created snapshot (also referred to as a clone in this context) may be created to expose a view to a non-production workload. In doing so, any writing done by this workload is reflected in nodes of the clone, while referring back to other views for data that is not changed by performing the non-production workload.

Figure 3:
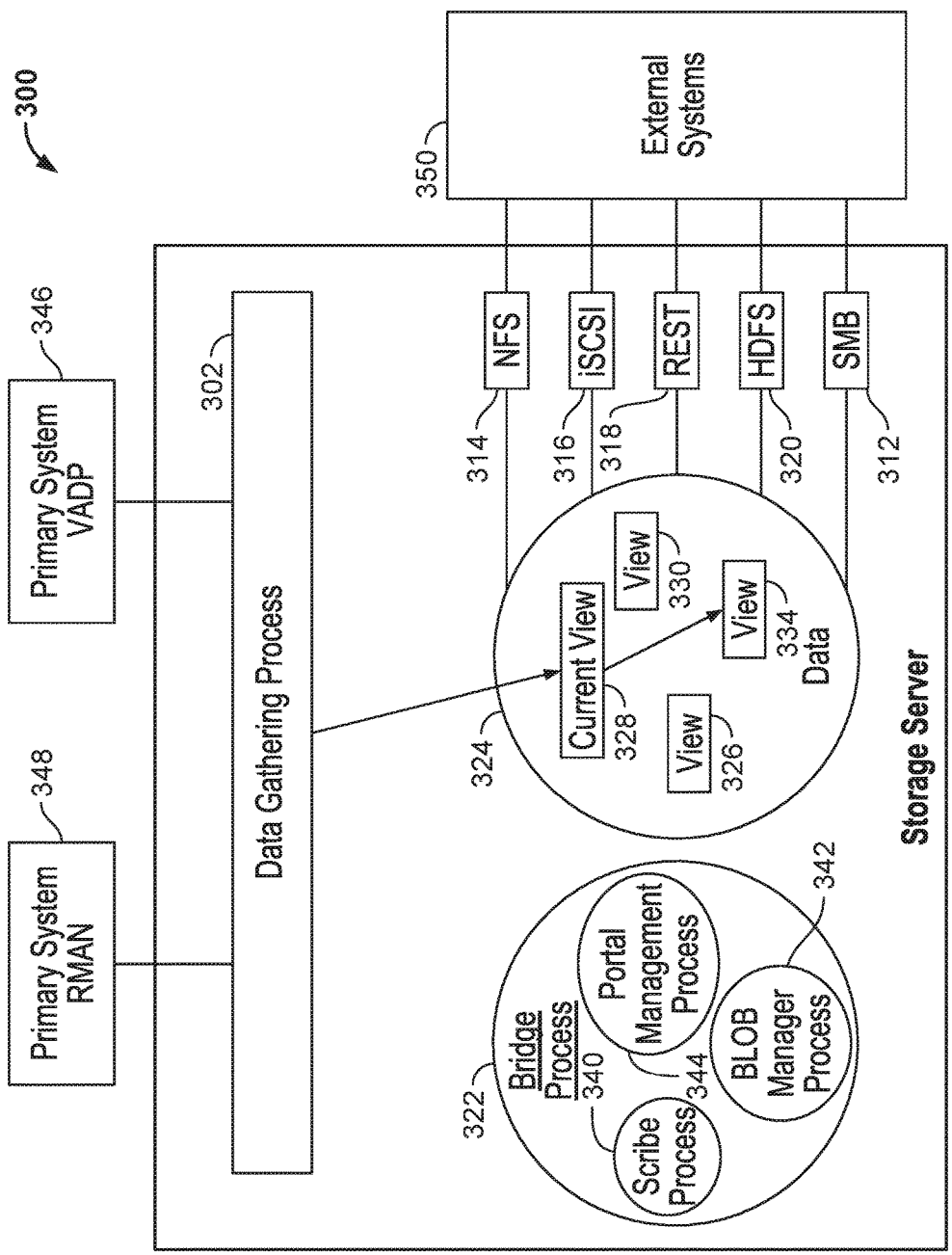
FIG. 3 depicts the interfaces for collecting and externally exposing the views, according to one embodiment.

FIG. 3 depicts software processes in a secondary storage system 300 for collecting and externally exposing views, according to one embodiment. As shown, the software processes include a bridge process 322 and a data gathering process 302. Additionally, the bridge process 322 includes a portal management process 344 for exposing data from the secondary storage system to external systems running the non-production workloads, a binary large object (BLOB) manager 342, and a scribe process 340. The scribe process 340 manages and stores data and metadata for the secondary storage system 300. That is, the scribe process 340 is generally configured to write and read to the key-value store on a given node. Other processes on the secondary storage server 300 ensure that changes made on one node are replicated to other nodes of a cluster of secondary storage systems 300.

In one embodiment, the data gathering process 302 provides an interface between the secondary storage server 300 and external data sources (e.g., a data store of one of the primary systems 348 and 346). When the secondary storage server 300 accesses a primary system, a protocol specific to that primary system is typically used to fetch data. For example, as shown, the primary system 348 uses the RMAN protocol to fetch data from an primary system running an Oracle database and primary system 346 uses the VADP APIs to fetch data from a primary system running a VMware cluster. Of course, depending on the primary system being backed up by the secondary storage server 300, other protocols for backing up data may be used.

As data is captured from a primary system (e.g., one of primary systems 346 and 348), the data gathering process 302 may store the backup data 324 in a current view 328 corresponding to that primary system. Additional views of the backup data 324 may correspond to incremental backups of the primary system data relative to specific points in time. For example, FIG. 3 shows views 326, 328, 330, and 334. In this example, the current view 328 generally corresponds to a "live" or most current backup state of data captured from a given primary system. Other views (e.g., views 326, 330, 334) can be derived from the current view 328 (or from other views). As shown, e.g., view 334 may provide a backup of the current view 328 captured at a particular point in time. In one embodiment, the secondary storage system 300 may create an incremental backup every five minutes (or other at other regular intervals or specified times), where each incremental backup captures a backup state of data of the primary system at the time the incremental backup is created. Additional examples of creating a view of backup data 324 are described below. Views 326 and 330 may be views created to expose a set of backup data to external system 350. Such views may provide a read-write clone of one of the incremental backups (e.g., of view 334).

When an external system 350 is used to access data 324 in secondary storage system 300, the external system 350 may do so by accessing data exposed by a particular view. Further, a view may be specifically created for a given external system 350. Doing so effectively gives the external system a "private" copy of the backup data, without having to actually replicate a complete copy of the backup data. In one embodiment, any modifications made to such a view are visible only to that view and therefore only to the external system 350. Further, once a backup of a primary system is captured, the secondary storage system 300 may expose views of the backup data to external systems 350 running non-production workloads using a variety of protocols. For example, as shown in FIG. 3, the portal management process 344 may expose data 324 using server message block (SMB) 312, network file system (NFS) 314, Internet Small Computer System Interface (iSCSI) 316, and the Hadoop Distributed File System (HDFS) 320. In addition to exposing data using these (or other) file system protocols, the portal management process 344 may also expose data 324 using other representations or formats, e.g., as objects based on the representational state transfer (REST) protocol. Of course, a view of backup data stored by the secondary storage system could be exposed to the external system 350 using a variety of other protocols, formats, or data representations.

Views created for an external system 350 can be persisted or discarded as needed for a particular case. Further, the variety of interfaces allow the secondary storage system 300 to maintain an internal organization for the snapshot data that is independent from the data organization implied by any of the protocols used to present the backup data to an external system 350. For example, if objects in the primary system are backed-up, then an external system may access those objects through the REST interface 318, without requiring that the secondary storage system to store the object data as objects.

Figure 4:
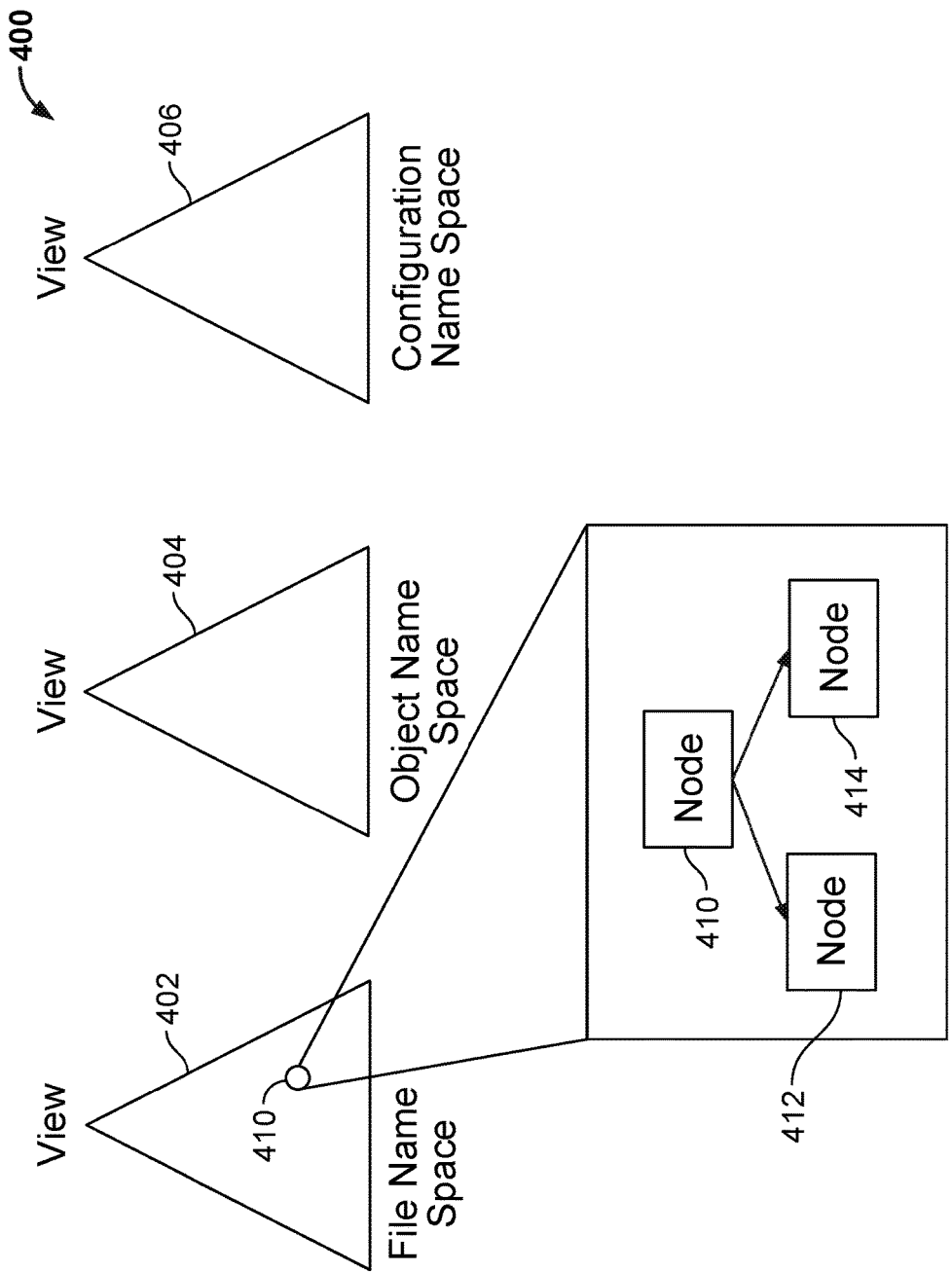
FIG. 4 depicts namespaces for different types of views, according to one embodiment.

Additionally, the secondary storage system 300 may maintain distinct namespaces for any given view. FIG. 4 depicts an example of various namespaces, according to one embodiment. In an embodiment, the namespaces include a file namespace 402, an object namespace 404, and a configuration namespace 406. The file namespace 402 is used for capturing data in the form of files from the primary system. The object namespace 404 is used to store information related to objects backed up from a primary system. For example, a primary system might maintain data in the form of objects, e.g., the Openstack platform includes a component named Swift that maintains objects. If the secondary storage system is used to backup objects from the Swift component, the object namespace 4040 may store namespace information for such objects. The configuration namespace 406 is used to capture configuration information from the primary system. As noted, each view 402, 404, 406 may be associated with a snaptree, some nodes of which are depicted as nodes 410 412, 414.

Figure 5:
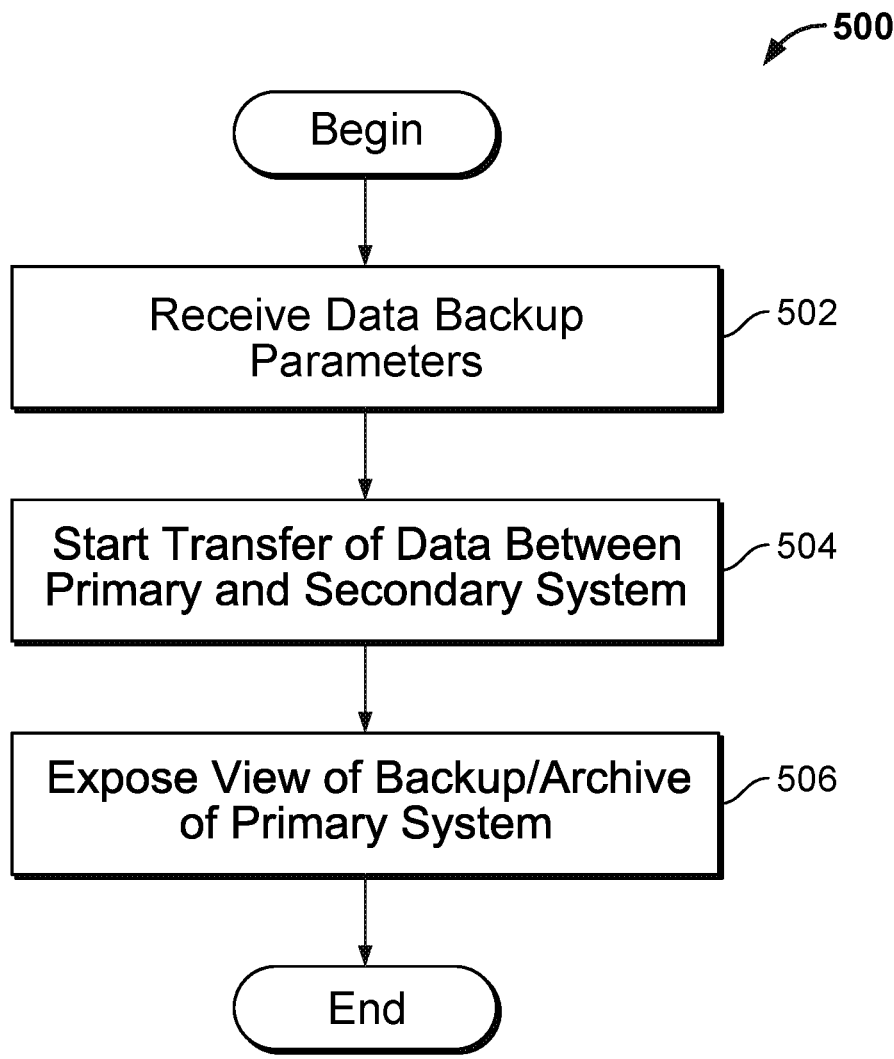
FIG. 5 depicts a process for creating a view, according to one embodiment.

FIG. 5 depicts a process 500 for creating a view, according to one embodiment. As shown, process 500 begins at step 502 where the secondary storage system receives data backup parameters for backing up a primary system. Such parameters may include bandwidth limitations on obtaining data from the primary system and a backup schedule that includes the frequency of performing the backup. Some parameters may be specific to the primary system being backed up. For example, to backup a VMware cluster, the IP address and credentials to access the VMware's vCenter component that manages that cluster are needed. Once configured, the data gathering process may begin transferring data from the primary to the secondary storage system (step 504). As the data streams into the secondary storage system, the data is written to a current view corresponding to that primary system (at step 506). Further, other views, or snapshots, of the current view may be created at any time.

Figure 6:
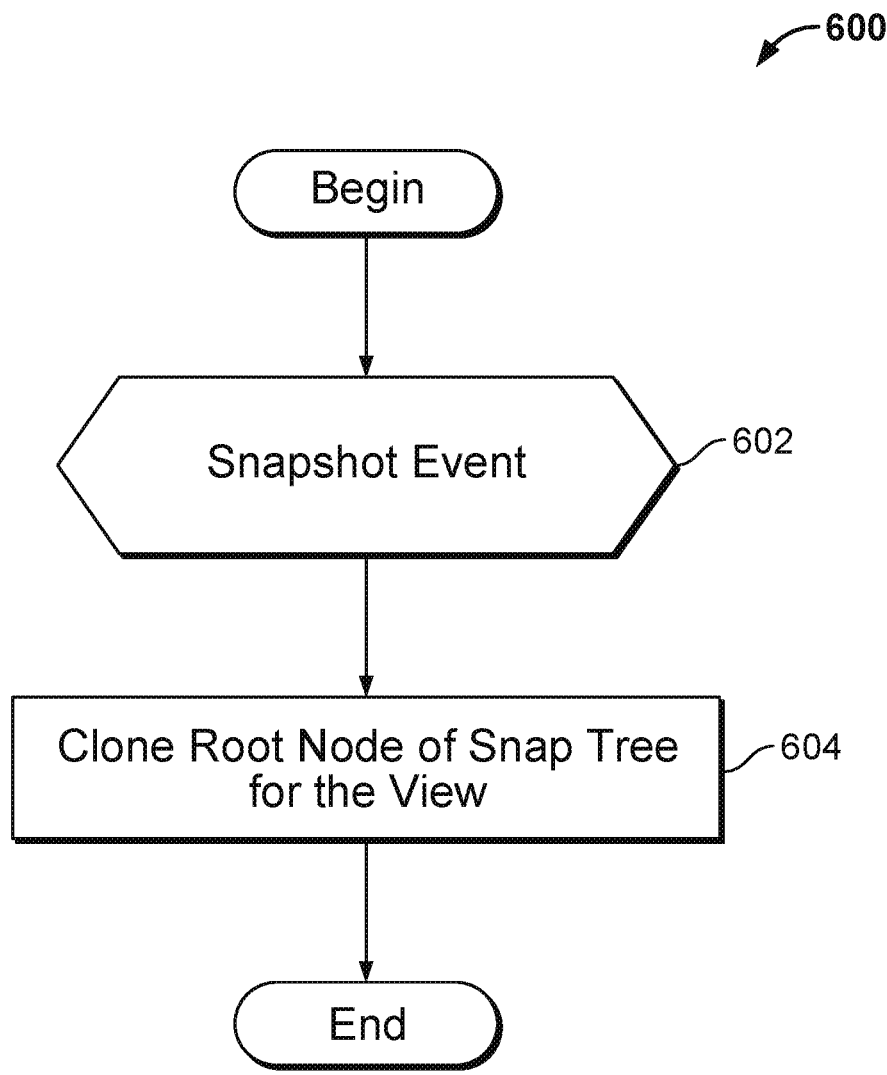
FIG. 6 depicts a process for creating a snapshot, according to one embodiment.

FIG. 6 depicts a process for creating a snapshot, according to one embodiment. As noted, a snapshot generally "freezes"

a backup state for a primary system at a specific point in time. Alternatively, a snapshot may create a clone of a existing view (i.e., of an incremental backup). As shown, at step 602, the secondary storage system determines that a snapshot should be created. For example, users may manually create a snapshot of a view to provide a data store for a secondary or non-production system. Similarly, as the secondary storage system is used to backup a primary storage system, the secondary storage system may create snapshots of the current view of that system at regular intervals—allowing the primary storage system to be restored to virtually any prior state. For example, the secondary storage system may create a new snapshot of a current view of a primary system every 5 minutes. In this context, each view provides a restore point for the primary storage system.

At step 604, the secondary storage system creates a new snapshot as needed in a particular case. In one embodiment, the secondary storage system creates a new snapshot of a view by creating a copy of the root node of the view from which the snap snapshot is being made. The clone of the root node includes pointers that reference the same child nodes as the root node of the view being cloned.

Further, once created, each view (i.e., each snapshot) may be accessed by a variety of other processes and systems. For example, as noted, a developer may access a view (or create a clone) to provide production data for a test and development system or a view may be exposed to a data analytics system. Similarly, each view could be traversed by a disaster recovery or archival process, allowing a backup (of the backup provided by the secondary storage system) to be replicated to a disaster recovery site or periodically written to a cloud-based archival service. For example, if a developer needs a local or private copy of a production data store, the developer can create a snapshot of that data store from any view created by the secondary storage system (such as one of the views created automatically every five minutes). To do so, the system creates a copy of the root node of the snaptree of the desired view and exposes a view of the cloned root node to the developer in a requested format (e.g., as an NFS mount point). Because the cloned root node points to the same child nodes as the root node of the snaptree being cloned, any reads of the cloned snaptree simply "reach back" into the snaptree being cloned. At the same time, any writes made to the cloned snaptree result in new branches in the cloned snaptree that do not "reach" back into the original. Instead, nodes written in the cloned root node are accessible only via that cloned root node.

Similarly, for the "current view" of a primary system, an incremental backup is created by copying the root node of the current view—which then becomes the current view for subsequent writes made by the data gathering process. That is, the root node of the current view (the one being copied) becomes the root node of the incremental backup. More generally, should any view need to remain writeable, any snapshot of that view results in two copies of the root node being created. Doing so allows the view to remain writeable by performing subsequent writes to one of the copies of the root node, while preserving the state of that view existing at the time the snapshot is made. That is, one clone of the root node is used for the snapshot (the snapshot clone) and the other for any subsequent writes to that view from which the snapshot is taken (the write clone). Doing so allows for read operations made against either the snapshot clone or write clone to "reach back" into the original view. At the same time, write operations are performed to either the write clone or the snapshot clone (depending on which view is being written to, the original view or the snapshot).

In one embodiment, the scribe process 340 in FIG. 3 manages a key value store ((k,v)-store), which includes a plurality of (k,v) pairs, where k is a key and v is a value associated with the key. The (k,v) pairs are available from the (k,v) store. In the secondary storage system, the (k,v)-store is used to store data structures for handling data backups generated for the primary storage system, as well as to expose backup data (as a snapshot) to non-production systems. In one embodiment, the (k,v)-store managed by the scribe process is stored in the SSD storage 112, 118 in FIG. 1, so that the scribe process can quickly access and update the key-value pairs.

Figure 7:
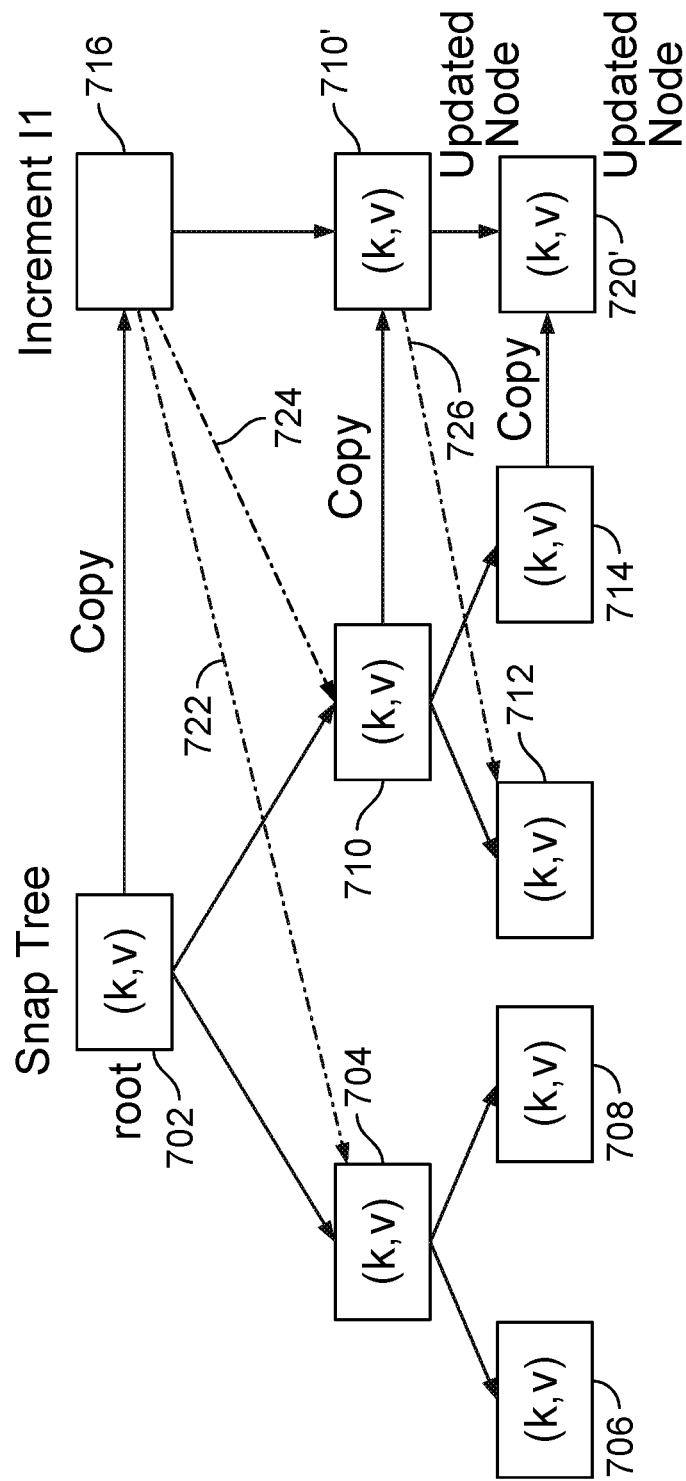
FIG. 7 depicts a snaptree formed from (k,v) pairs managed by a scribe process, according to one embodiment.

As noted, snapshots described above are stored in tree data structure, referred to as a snaptree. In one embodiment, leaves of the a snaptree store a key-value pair the (k,v)-store. That is, leaves of the snaptree store metadata indicating where data (v) corresponding to a key (k) may be found (or a copy of the data corresponding to a given key). Nodes that are not leaf nodes have pointers to child nodes. FIG. 7 depicts a snaptree formed from (k,v) pairs managed by scribe, according to one embodiment. In the figure, the root 702 of the snap tree has children 704 and 710. Child node 704 has children 706 and 708. Child node 710 has children 712 and 714. Each leaf node includes a (k,v) pair as shown. Other nodes indicate the range of key values may be accessed by traversing to a next node using a given pointer. In one embodiment, a leaf also may include file system data, when that data under a given size. That is, in some cases, the snaptree—generally used to store metadata indicating where data associated with a key value (k) may be found—stores the actual data associated with a given key. Note, the size of data stored in the snaptree directly (and typically therefore in SSD storage), may be tailored as a matter of preference. However, a value of 256 Kbytes has proven to be effective. Otherwise, the values in each key-value pair leaf point to a BLOB storing data corresponding to the key Using snaptrees for snapshots provides several advantages with respect to both searching and modifying snapshot data, and with respect to isolation of workloads. The snaptree can be searched efficiently and rapidly to find data because searching a tree is bounded by the depth of the tree, which is much less than if the nodes were arranged in linear order. The snaptree can also be modified quickly. FIG. 7 depicts an incremental modification 716 to the snaptree 702, according to one embodiment. As shown, child nodes 710 and 714 are modified by an increment 716, which is a new root to an independent tree 716, 710', 720' involving nodes 704, 710, 712, and 714 as indicated by markers 722, 724, and 726. To handle an incremental modification, the nodes 710 and 714 are copied to nodes 710' and 720' of the new tree and then modified. This is efficient because only the nodes 710' 720' involved in the modification are copied and a search for the modified data is again bounded by the depth of the new tree. Finally, the snaptree provides isolation with respect to the data it controls, because the system can maintain separate snaptrees for data involved in different workloads.

Figure 8:
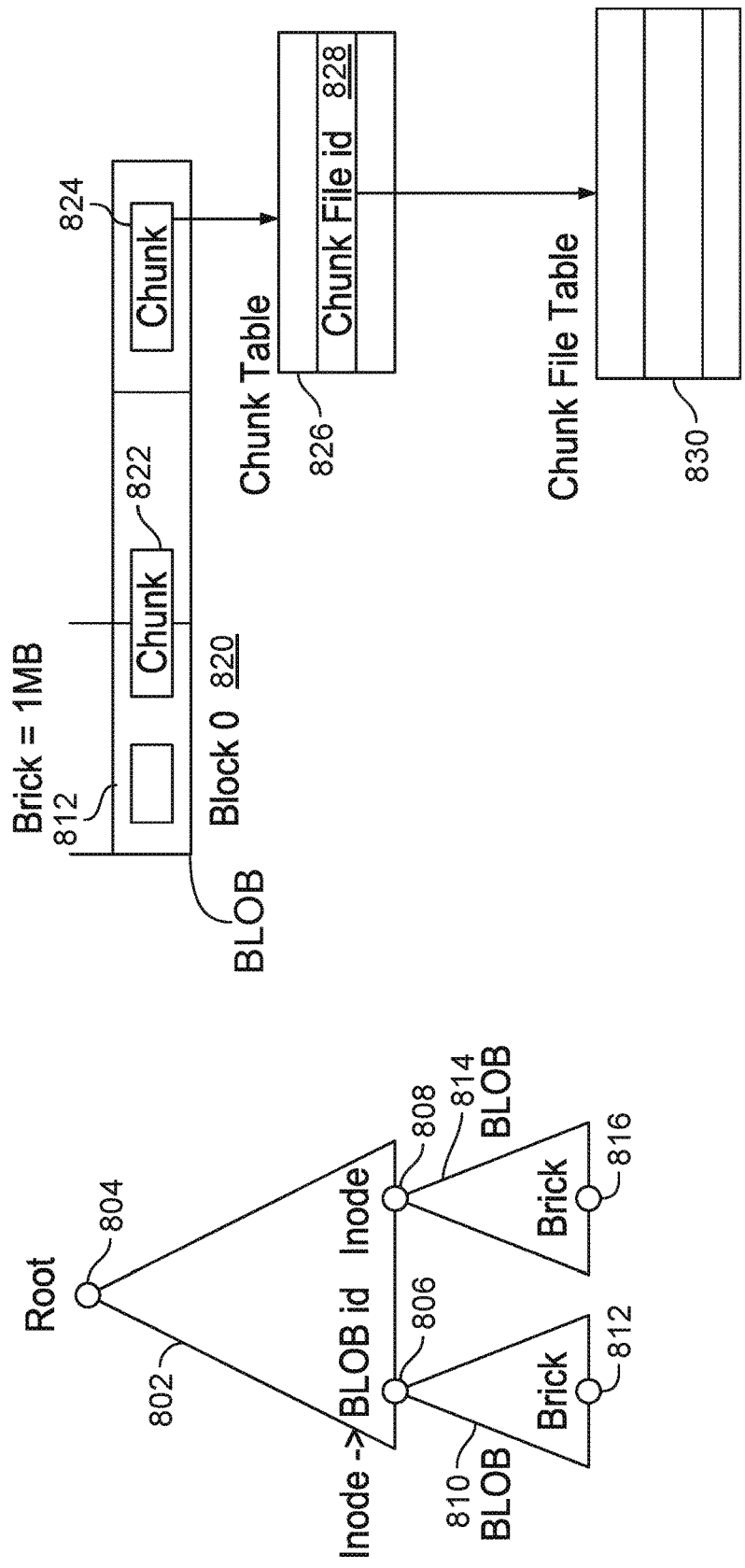
FIG. 8 depicts a more detailed view of the snaptree and BLOBs, according to one embodiment.

FIG. 8 depicts another view of a snaptree 802 and of BLOB trees 810, 814, according to one embodiment. As mentioned, the view data is captured and stored in snaptrees. When the size of the data is relatively small, the data is stored directly in the snaptree 802 along with metadata necessary to find the actual data. When the size of the data is relatively large, the snaptree 802 stores metadata, which points to a BLOB 810, 814. The BLOB 810, 814 in turn has nodes that describe containers called bricks 812, 816. In one embodiment, a brick 812, 816 is a one megabyte block of data. Bricks in turn contain chunks 822, 824, which are smaller containers for data. A chunk in a BLOB may or may not be deduplicated. If a chunk is deduplicated it may not align with bricks. If a chunk is not deduplicated, it aligns with a brick. A chunk 822, 824 points to a chunk table 826, whose contents contain pointers to file ids 828. The pointer 828 to file IDs points to a chunk file table 830 that contains the portion of data sought.

Figure 9:
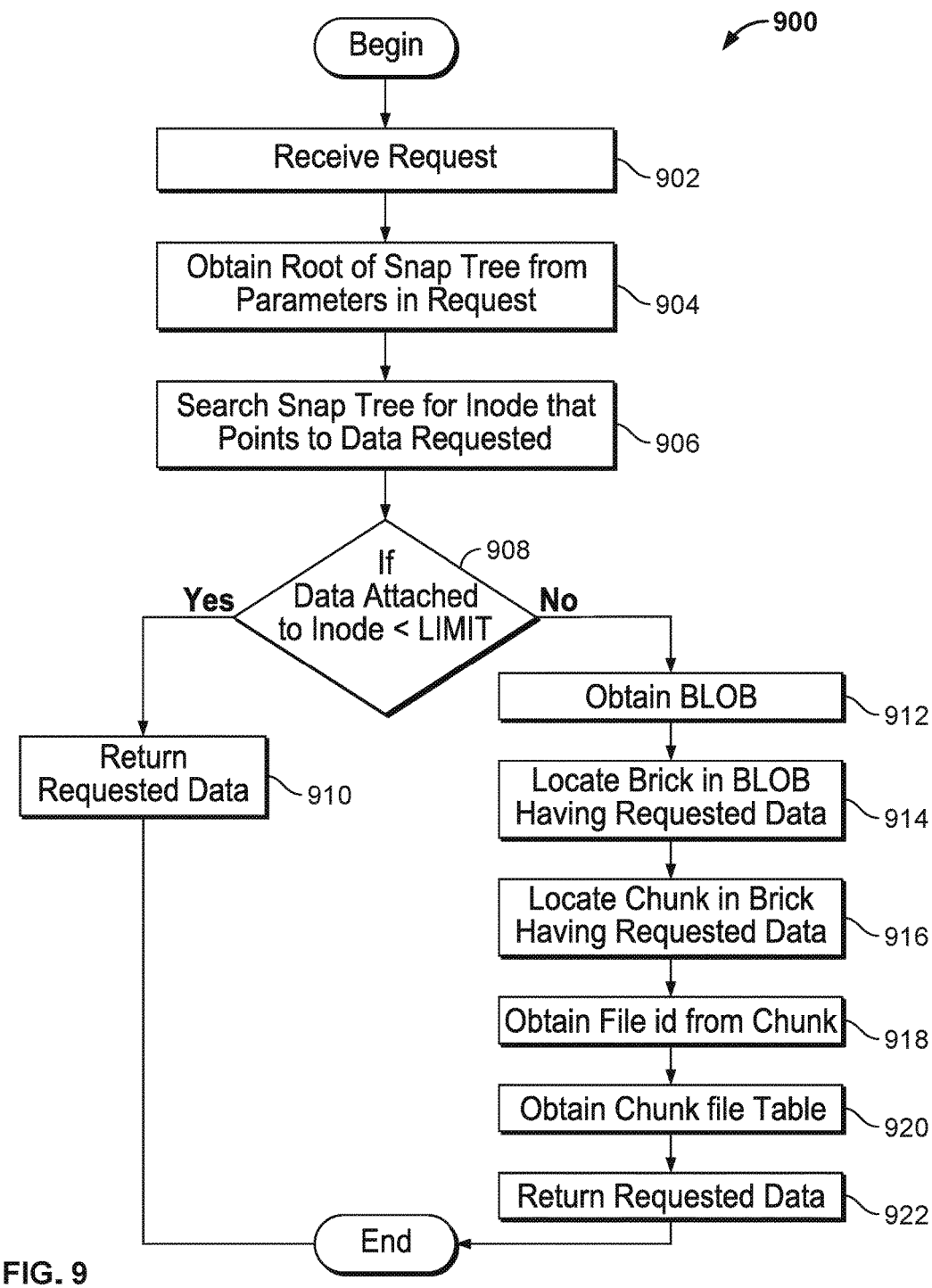
FIG. 9 depicts a process for accessing the snaptree to service a data request, according to one embodiment.

FIG. 9 depicts a process 900 for accessing a snaptree to service a data request, according to one embodiment. For example, a user may be interacting with system used to perform test and development functions or to perform data analytics using data stored on the secondary storage system. For example, a user doing application testing and development may want to test a new (or new version of an) enterprise application using a snapshot of actual production data. To do so, the user selects the desired snapshot, which may be exposed as needed for the enterprise application being tested (e.g., as an NFS mount point). Once mounted, the secondary storage system allows the test application to access data in the snapshot as though it were a block storage device in the case of an access via iSCSI or as a file system in the case of an access via NFS. As shown, the process 900 begins at step 902 where the bridge process 322 in FIG. 3 receives an interface request, such as an NFS request, for secondary storage system data. In response, at step 904, the bridge process derives a logical key from the parameters in the NFS request. For example, the parameters of the NFS request could include an inode ID, a viewID, and a range of data. At step 906, the bridge process then uses the logical key to look up the root of the snaptree containing the data (or metadata) for the request.

At step 906, bridge process 322 then traverses the snaptree to find an index node (inode) that indicates the location of the data. If the amount of data attached to the inode is less than LIMIT, (e.g., LIMIT is 256K bytes), then the data is stored in the value of the key as part of the node of the snaptree itself along with the inode. If so, the bridge process returns the data at step 910. If at step 908, the size of the request is large then the inode points to a binary large object (BLOB), which may provide another snaptree containing further information about the location of the requested data. In such case, the bridge process obtains and ID for a BLOB (step 912). In step 914, the bridge process then searches the BLOB to find the data. The node or leaf for the requested data contains an item called a brick, which in one embodiment is 1 Megabyte. The brick object contains one or more chunks and the chuck for the requested data is then found in step 918. The chunk then leads to a chunk table in step 920, which contains a chunk file id and the chunk file ID then leads to a chunk file table, which finally gives the location of the requested data, which is then returned to satisfy the request in step 922.

In this manner, snaptrees provide rapid access to requested data, including rapid access to random items of data in the snaptree. Additionally, because increments to the snaptree data are stored in a tree-like manner, read and write access to the increment data is also rapid. Finally, because each different type of data is stored in different snaptrees, workload traffic to one snaptree has very little effect on workload access to a different snaptree. This allows the secondary storage system to sustain widely different types of workloads including normal backup workloads along with non-production workloads, such as business analytics and test and development workloads that were serviced by separate systems.

Figure 10:
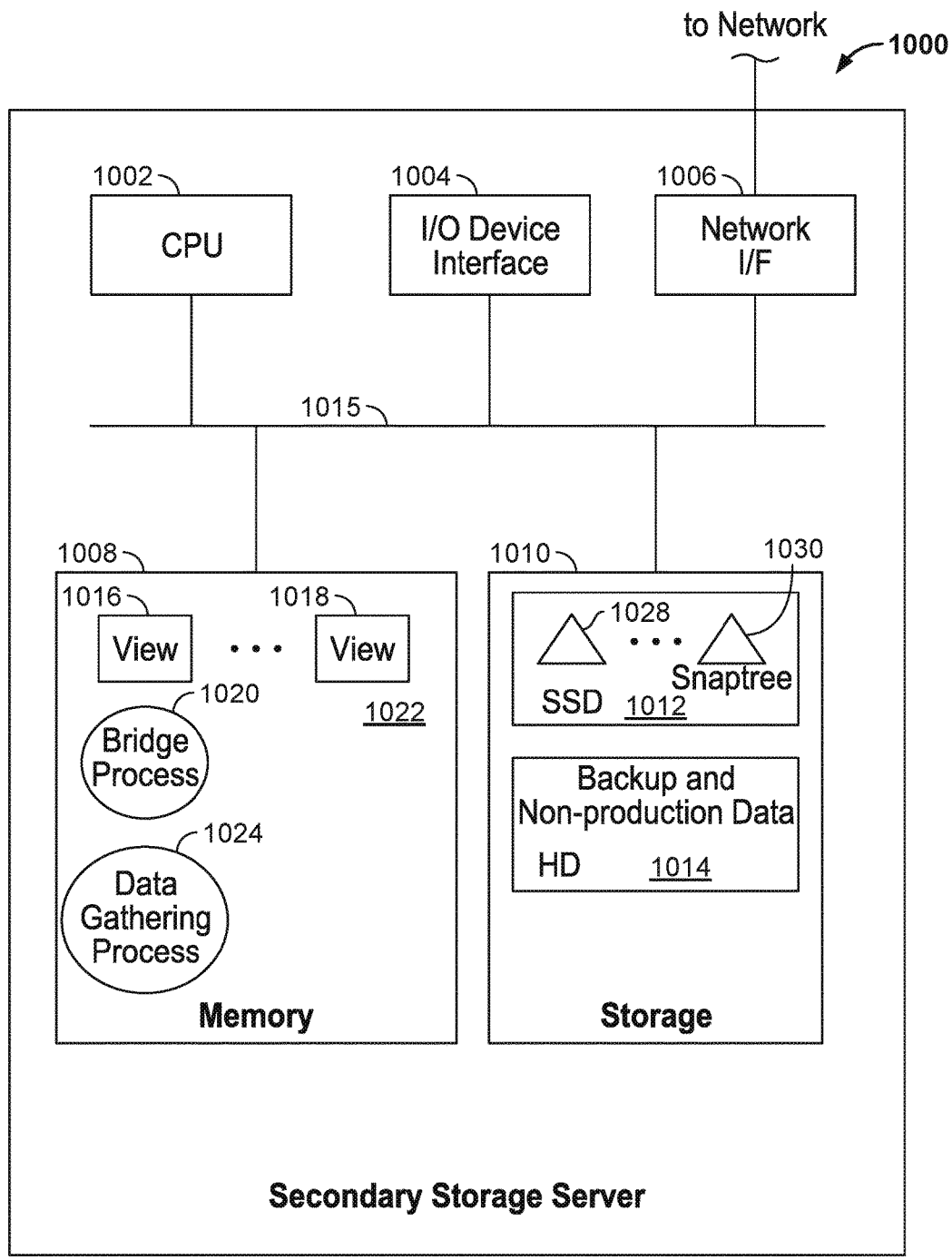
FIG. 10 depicts an example system for a secondary storage server, according to one embodiment.

FIG. 10 depicts an example computing system 1000 for a secondary storage server. As shown, the computing system 1000 includes, without limitation, a central processing unit CPU 1002, a network interface 1006, a memory 1008 for storing CPU programming instructions and storage 1010, each connected to a bus 1016. The computing system 1000 may also include an I/O device interface 1004 connecting I/O devices (e.g., keyboard, display, and mouse devices) to the computing system 1000. Further, in context of this disclosure, the computing elements shown in computing system 1000 may correspond to a physical computing system (e.g., a system in a data center) or may be a virtual computing instance.

The CPU 1002 retrieves and executes programming instructions stored in the memory 1008 as well as stores and retrieves application data residing in storage 1010. The memory 1008 also stores the views 1016, 1018, the bridge processes 1020 and the data gathering processes 1024 for carrying out the functions of the secondary storage system. The bus 1016 is used to transmit programming instructions and application data between the CPU 1002, I/O devices interface 1004, storage 1010, network interface 1006, and memory 1008. Note, CPU 1002 is included to be representative of a single CPU, multiple CPUs, a single CPU having multiple processing cores, and the like. The memory 1008 is generally included to be representative of a random access memory. The storage 1010 may include a disk drive storage device 1014 and a solid state storage device 1012. In one embodiment, the disk drive storage device 1014 stores backup and non-production data and the solid state storage device 1012 stores snaptrees 1028, 1030. Although shown as a single unit, the storage 1010 may be a combination of fixed and/or removable storage devices, such as fixed disc drives, removable memory cards, optical storage, network attached storage (NAS), or a storage area-network (SAN).

Figure 11:
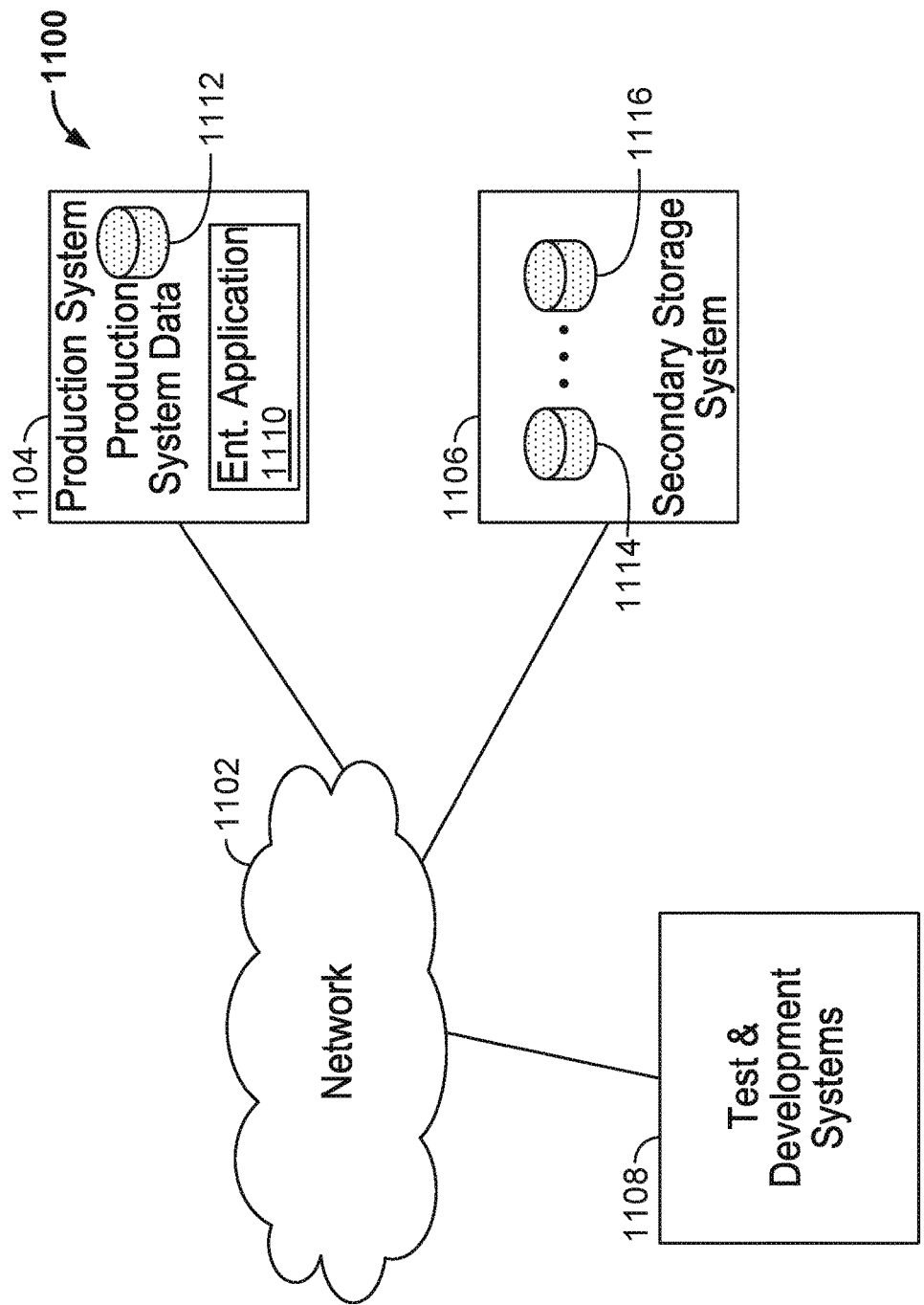
FIG. 11 depicts an arrangement of a production system hosting one or more enterprise applications, a test and development system, and a secondary storage system according to one embodiment.

FIG. 11 depicts an arrangement of a production system hosting one or more enterprise applications, a test and development system, and a secondary storage system according to one embodiment. The production system 1104 with the enterprise applications 1110 and production system data 1112 is connected to a network 1102, along with test and development systems 1108 and a secondary storage system 1106 with secondary storage data 1114, 1116. The network 1102 can be a local area network, a wide area network, or the Internet or combinations thereof. The secondary storage system provides both backup and non-production data services for the production system 1104 and the test and development systems 1108.

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a first set of data from a primary storage system to store in a secondary storage system, wherein the received data provides a backup of data stored by the primary storage system, wherein the first set of data corresponds to a first snapshot of the primary storage system;
generating at least a first view of the first set of data corresponding to the first snapshot in the secondary storage system, wherein the first view of the first set of data corresponding to the first snapshot includes a first tree data structure having a root node, one or more intermediate nodes, and one or more leaf nodes;
receiving a second set of data from the primary storage system to store in the secondary storage system, wherein the second set of data corresponds to a second snapshot of the primary storage system;
generating, from the first view of the first set of data corresponding to the first snapshot, at least a second view of the second set of data corresponding to the second snapshot in the secondary storage system, wherein generating the second view corresponding to the second snapshot comprises copying the root node of the first tree data structure associated with the first view of the first set of data corresponding to the first snapshot, wherein the second view of the second set of data corresponding to the second snapshot includes a second tree data structure that at least includes the copied root node, wherein the copied root node includes one or more corresponding pointers to the one or more intermediate nodes of the first view of the first set of data corresponding to the first snapshot; and
in response to the second set of data including new data, generating one or more new leaf nodes corresponding to the new data in the second tree data structure associated with the second view of the second set of data corresponding to the second snapshot, wherein the copied root node associated with the second view of the second set of data corresponding to the second snapshot includes a pointer that directly or indirectly references the one or more new leaf nodes, and wherein the one or more new leaf nodes are not exposed by the first view of the first set of data corresponding to the first snapshot.

2. The method of claim 1, wherein the received first set of data provides a backup of data stored by the primary storage system.

3. The method of claim 1, wherein the one or more leaf nodes and the one or more new leaf nodes have a corresponding key-value pair that indicates a location of corresponding data in the secondary storage system.

4. The method of claim 1, wherein the first set of data corresponds to the first snapshot of the primary storage system at a first moment in time.

5. The method of claim 4, wherein the second set of data corresponds to the second snapshot of the primary storage system at a second moment in time, wherein the first moment in time occurred before the second moment in time.

6. The method of claim 1, wherein generating one or more new leaf nodes corresponding to the new data in the second tree data structure associated with the second view of the second set of data corresponding to the second snapshot comprises:
generating an intermediate node;
updating one of the one or more corresponding pointers that points to one of the one or more intermediate nodes of the first view of the first set of data corresponding to the first snapshot to point to the generated intermediate node.

7. The method of claim 6, wherein the generated intermediate node is a copy of the one of the one or more intermediate nodes of the first view of the first set of data corresponding to the first snapshot.

8. The method of claim 6, wherein the intermediate node includes a pointer that points to one of the one or more new leaf nodes.

9. The method of claim 1, further comprising:
receiving a request for data exposed by the second view of the second set of data corresponding to the second snapshot;
traversing the second tree data structure from the copied root node to one of the one or more new leaf nodes; and
returning the requested data.

10. The method of claim 1, further comprising:
receiving a request for data exposed by the second view of the second set of data corresponding to the second snapshot;
traversing the second tree data structure from the copied root node to one of the one or more leaf nodes associated with the first tree data structure, wherein the copied root node includes a pointer that directly or indirectly references the one of the one or more leaf nodes associated with the first tree data structure.

11. The method of claim 1, wherein the one or more leaf nodes include file system data.

12. The method of claim 1, wherein at least one of the one or more leaf nodes includes a pointer to a third tree data structure.

13. The method of claim 12, wherein a leaf node of the third tree data structure includes a pointer to a chunk file table.

14. The method of claim 1, wherein at least one of the one or more new leaf nodes includes a pointer to a third tree data structure.

15. A system, comprising:
a processor configured to:
receive a first set of data from a primary storage system to store in a secondary storage system, wherein the received data provides a backup of data stored by the primary storage system, wherein the first set of data corresponds to a first snapshot of the primary storage system;
generate at least a first view of the first set of data corresponding to the first snapshot in the secondary storage system, wherein the first view of the first set of data corresponding to the first snapshot includes a first tree data structure having a root node, one or more intermediate nodes, and one or more leaf nodes;
receive a second set of data from the primary storage system to store in the secondary storage system, wherein the second set of data corresponds to a second snapshot of the primary storage system;
generate, from the first view of the first set of data corresponding to the first snapshot, at least a second view of the second set of data corresponding to the second snapshot in the secondary storage system, wherein generating the second view corresponding to the second snapshot comprises copying the root node of the first tree data structure associated with the first view of the first set of data corresponding to the first snapshot, wherein the second view of the second set of data corresponding to the second snapshot includes a second tree data structure that at least includes the copied root node, wherein the copied root node includes one or more corresponding pointers to the one or more intermediate nodes of the first view of the first set of data corresponding to the first snapshot; and
in response to the second set of data including new data, generate one or more new leaf nodes corresponding to the new data in the second tree data structure associated with the second view of the second set of data corresponding to the second snapshot, wherein the copied root node associated with the second view of the second set of data corresponding to the second snapshot includes a pointer that directly or indirectly references the one or more new leaf nodes, and wherein the one or more new leaf nodes are not exposed by the first view of the first set of data corresponding to the first snapshot; and
a memory coupled to the processor and configured to provide the processor with instructions.

16. The system of claim 15, wherein the received first set of data provides a backup of data stored by the primary storage system.

17. The system of claim 15, wherein the one or more leaf nodes and the one or more new leaf nodes have a corresponding key-value pair that indicates a location of corresponding data in the secondary storage system.

18. The system of claim 15, wherein the first set of data corresponds to the first snapshot of the primary storage system at a first moment in time.

19. The system of claim 18, wherein the second set of data corresponds to the second snapshot of the primary storage system at a second moment in time, wherein the first moment in time occurred before the second moment in time.

20. A computer program product, the computer program product being embodied in a non-transitory computer readable storage medium and comprising computer instructions for:
receiving a first set of data from a primary storage system to store in a secondary storage system, wherein the received data provides a backup of data stored by the primary storage system, wherein the first set of data corresponds to a first snapshot of the primary storage system;
generating at least a first view of the first set of data corresponding to the first snapshot in the secondary storage system, wherein the first view of the first set of data corresponding to the first snapshot includes a first tree data structure having a root node, one or more intermediate nodes, and one or more leaf nodes;
receiving a second set of data from the primary storage system to store in the secondary storage system, wherein the second set of data corresponds to a second snapshot of the primary storage system;
generating, from the first view of the first set of data corresponding to the first snapshot, at least a second view of the second set of data corresponding to the second snapshot in the secondary storage system, wherein generating the second view corresponding to the second snapshot comprises copying the root node of the first tree data structure associated with the first view of the first set of data corresponding to the first snapshot, wherein the second view of the second set of data corresponding to the second snapshot includes a second tree data structure that at least includes the copied root node, wherein the copied root node includes one or more corresponding pointers to the one or more intermediate nodes of the first view of the first set of data corresponding to the first snapshot; and
in response to the second set of data including new data, generating one or more new leaf nodes corresponding to the new data in the second tree data structure associated with the second view of the second set of data corresponding to the second snapshot, wherein the copied root node associated with the second view of the second set of data corresponding to the second snapshot includes a pointer that directly or indirectly references the one or more new leaf nodes, and wherein the one or more new leaf nodes are not exposed by the first view of the first set of data corresponding to the first snapshot.

* * * * *